(12) United States Patent
Krishnamoorthy et al.

(10) Patent No.: US 9,495,175 B2
(45) Date of Patent: *Nov. 15, 2016

(54) DEPLOYING MULTI-CHANNEL OR DEVICE AGNOSTIC APPLICATIONS

(71) Applicant: Bank of America Corporation, Charlotte, NC (US)

(72) Inventors: Sundar Krishnamoorthy, East Windsor, NJ (US); Devi S. Kumar, West Windsor, NJ (US); Suresh G. Nair, Robbinsville, NJ (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/514,923

(22) Filed: Oct. 15, 2014

(65) Prior Publication Data

US 2015/0227305 A1 Aug. 13, 2015

Related U.S. Application Data

(63) Continuation-in-part of application No. 14/224,317, filed on Mar. 25, 2014.

(60) Provisional application No. 61/939,186, filed on Feb. 12, 2014.

(51) Int. Cl.
*G06F 15/00* (2006.01)
*G06F 13/00* (2006.01)
(Continued)

(52) U.S. Cl.
CPC ............... *G06F 9/4443* (2013.01); *G06F 8/38* (2013.01); *G06F 9/44505* (2013.01)

(58) Field of Classification Search
CPC .............................. G06Q 10/063; G06F 17/30
USPC ........ 715/763–765, 700, 751–753, 740, 748, 715/761
See application file for complete search history.

(56) References Cited

U.S. PATENT DOCUMENTS

| 7,315,826 B1 * | 1/2008 | Guheen ............... G06F 17/3089 703/27 |
| 8,121,874 B1 * | 2/2012 | Guheen ............... G06Q 10/063 705/28 |

(Continued)

OTHER PUBLICATIONS

AppNotch, "Easiest way to create Apps," Feb. 7, 2014, retrieved from http://web.archive.org/web/20140207151427/http://www.appnotch.com/[Nov. 5, 2014 2:39:19 PM] on Nov. 5, 2014.

(Continued)

*Primary Examiner* — Kevin Nguyen
(74) *Attorney, Agent, or Firm* — Banner & Witcoff, Ltd.; Michael A. Springs

(57) ABSTRACT

Various user interface components and features can be tested and simulated with the unified framework module, and the full application user experience can be tested, experienced and evaluated. This can assist the design process of an application in providing the ability to test and explore different user interface components. During this process the user components can be simulated to provide the user experience so it can be determined whether the user components are organized properly and the prototype can be validated before the full blown application is launched. Also user interface features can be further modified or added based on the user feedback. The unified framework module can be configured to package a program in a form that is suitable for any targeted device and/or channel to make deployment across various devices and channels more efficient and cost effective.

20 Claims, 6 Drawing Sheets

(51) Int. Cl.
*G06F 9/44* (2006.01)
*G06F 9/445* (2006.01)

(56) References Cited

U.S. PATENT DOCUMENTS 9,218,344 B2* 12/2015 Al-Kofahi ............... G06F 17/30
2003/0023473 A1* 1/2003 Guyan ............. G06Q 10/06311
705/4

OTHER PUBLICATIONS

Jan. 15, 2016—(US) Non Final Office Action—U.S. Appl. No. 14/224,317.
Ranaivo, Yann, "Mobile development firm moves into Innovation Depot," Birmingham Business Journal, dated Jan. 14, 2014, downloaded Mar. 10, 2014 from http://innovationdepot.net/2014/01/mobile-development-firm-moves-into-innovation-depot/, 3 pages.

* cited by examiner

DEPLOYING MULTI-CHANNEL OR DEVICE AGNOSTIC APPLICATIONS

CROSS REFERENCE TO RELATED APPLICATION

This Application is a continuation-in-part of U.S. application Ser. No. 14/224,317 filed on Mar. 25, 2014, which claims benefit to U.S. Provisional Application No. 61/939,186 filed on Feb. 12, 2014.

FIELD

Aspects of the disclosure generally relate to developing multi-channel deployable, device agnostic applications. More specifically, aspects of the disclosure provide example methods and example apparatuses that provide a unified framework for implementing a multi-channel deployable device agnostic application.

BACKGROUND

Developing and coding a user interface, for example, on a mobile application can often times be a very time consuming and difficult process. The process can be more difficult when writing code for multi-platform applications that are configured to run on different devices and channels. Each device or channel can have its very own set of features that may have to be accounted for during the deployment of the application. For example, implementing a user interface for a touchscreen device can be very different from designing a user interface for a non-touch screen device.

One approach may include focusing on the particular device or channel and adapting the application to the particular platform of the device. Although this approach may be useful in certain instances, following this approach may result in the need to design the application multiple times for each device or channel in implementing the application. Another approach may include focusing directly on the application to be deployed and to design the application to have a similar appearance and feel across each device and channel. To implement the application on a particular device, one approach may be to translate the program into the appropriate code for the particular device.

Current application development can be biased towards application-style development and can be tightly coupled to the target device that the end-user intends to use, e.g., workstation, browser, smartphone, tablet, and the like. Software can be written and delivered for only a workstation, or only for a mobile device, or for only a browser. This may lead to high heterogeneity in the user experience space, lack of reusability of code developed, longer time-to-market as similar capabilities are developed across multiple devices, and ultimately a higher cost to support a growing set of technology components.

BRIEF SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

An example method for developing a device agnostic application may include one or more of: (1) providing an application having one or more reusable user interface components, (2) analyzing the application for the one or more reusable user interface components (3) assembling the reusable user interface components from a repository, or (4) extending the application and the user interface to at least one device or channel.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of examples various examples in which the disclosure may be practiced. It is to be understood that other embodiments may be utilized and structural and functional modifications may be made without departing from the scope of the present disclosure. The disclosure is capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning For example, the use of "including" and "comprising" and variations thereof is meant to encompass the items listed thereafter and equivalents thereof as well as additional items and equivalents thereof, and the use of the terms "mounted," "connected," "coupled," "positioned," "engaged" and similar terms, is meant to include both direct and indirect mounting, connecting, coupling, positioning and engaging.

As noted above, various aspects of the disclosure relate to developing multi-channel deployable, device agnostic applications. Before discussing these aspects in greater detail, however, several examples of network architectures and data processing devices that may be used in implementing various aspects of the disclosure will first be discussed.

Figure 1:
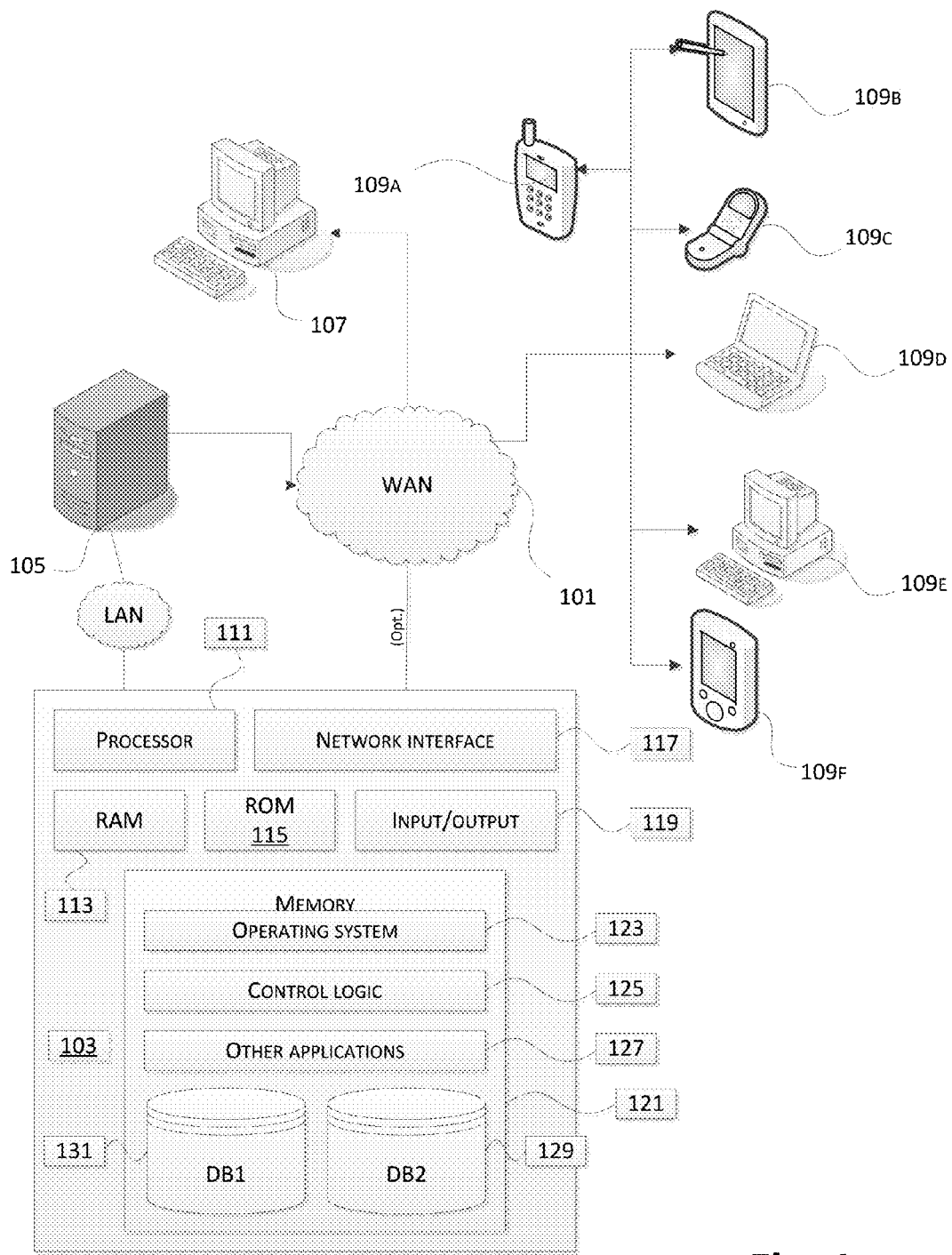
FIG. 1 illustrates one example of a network architecture and data processing device that may be used to implement one or more illustrative aspects discussed herein.
Figure 2:
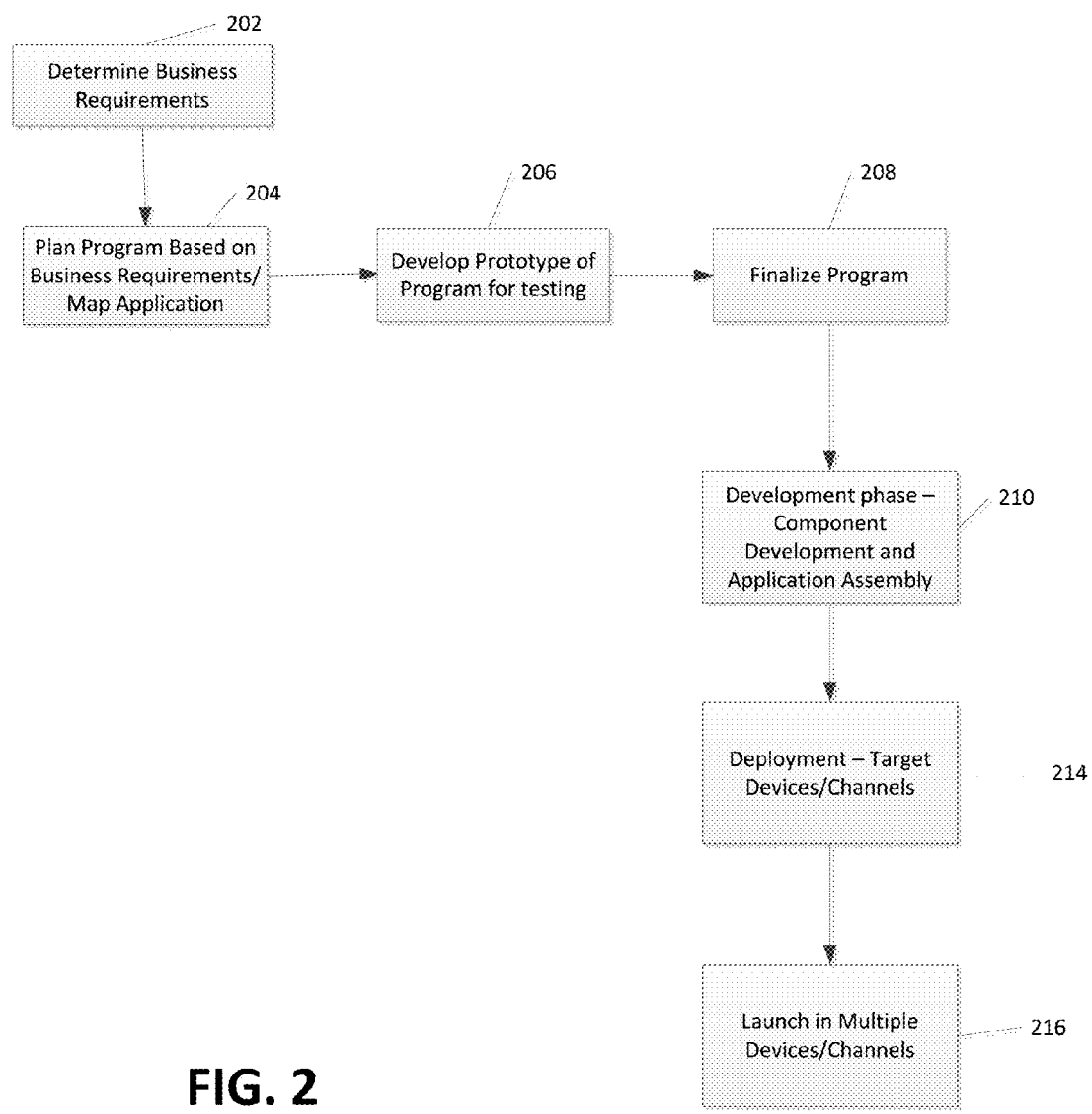
FIG. 2 illustrates a schematic of an exemplary process disclosed herein.

FIG. 1 illustrates one example of a network architecture and data processing device that may be used to implement one or more illustrative aspects. Various network nodes 103, 105, 107, and 109A-F may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN)

may have one or more of any known LAN topology and may use one or more of a variety of different protocols, such as Ethernet. Devices 103, 105, 107, 109A-F and other devices (not shown) may be connected to one or more of the networks via twisted pair wires, coaxial cable, fiber optics, radio waves or other communication media. For example, the above connections can be made via the internet, blue tooth, WiFi, infrared, or any other known method of wireless transmission.

As shown in FIG. 1, devices 109A-F may include personal computers such as desktops, laptops, notebooks, mobile telephones or smartphones with applications and other functionality, a handheld device with Wi-Fi or other wireless connectivity (e.g., wireless enabled tablets, tablet computers, PDAs, and the like), displays with built-in or external memories and processors, or any other known computer, computing device, or handheld computer can also be connected to one or more of the networks described herein. It is also contemplated that other types of devices such as ATMs, kiosks, and other devices can be connected to one or more of the networks described herein. These devices can be enabled to communicate with wireless access points which in one example can be a series of cellular towers hosted by a service provider. Additionally, the wireless access points may be Wi-Fi (e.g., compatible with IEEE 802.11a/b/g/and the like wireless communication standards) connections and the computing devices may obtain access to the Internet at these connections. Other known techniques may be used to allow devices to connect with a network.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, and devices 109a-f. Data server 103 provides overall access, control and administration of databases and control software for performing one or more illustrative aspects as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, devices 109a-f, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 or devices 109a-f a user may access web server 105 using an Internet browser, as is known in the art, or by executing a software application or app that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device as discussed herein. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, or the like), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects as described herein, and other application software 127 providing secondary, support, and/or other functionality which may or may not be used in conjunction with one or more aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, or the like).

Memory 121 may also store data used in performance of one or more aspects, including a first database 129 and a second database 131. In some embodiments, the first database may include the second database (e.g., as a separate table, report, or the like). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109a-f) as described herein may be spread across multiple data processing devices, for example, to distribute processing load across multiple computers, to segregate transactions based on geographic location, user access level, quality of service (QoS), or the like.

One or more aspects may be embodied in computer-usable or readable data and/or computer-executable instructions, such as in one or more program modules, executed by one or more computers or other devices as described herein. Generally, program modules include routines, programs, objects, components, data structures, or the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, or the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects, and such data structures are contemplated within the scope of computer executable instructions and computer-usable data described herein.

In one example, a unified user experience across all devices, platforms, and/or channels that can create software once and deploy that software across numerous devices, platforms, and/or channels without having to recreate the code for each system. Aspects of an application building process, where an end-to-end user interface can be developed to launch in multiple channels or devices, will now be described in relation to FIGS. 2-6. In step 202, the application requirements can be received, which is also represented in FIG. 4 at step 404. The application requirements can come in many different forms and may identify certain goals that are to be included in the application and the user interface of the application. During this process, the program can be developed based on the desired requirements, and the application can also be mapped out in terms of what needs to be developed as a reusable widget in step 204. For example, the look and feel of the program, certain menu items, display features, tools, and the like can be determined and stored for future access in a repository 316 as part of a unified framework module 304, which will be described in further detail below.

In step 206, also shown in FIG. 4 as step 406, a prototype of the program can be developed for testing in the unified framework module 304. In this way, various user interface components and features can be tested and simulated, and the full application user experience can be tested, experienced and evaluated. This can assist the design process in providing the ability to test and explore different user interface components. During this process the user components can be simulated to provide the user experience so it can be determined whether the user components are organized properly, and the prototype can be validated before the full blown application is launched. Also user interface features can be further modified or added based on the user feedback. This process can undergo various iterations until the prototype and the user experience is perfected, and the concept is otherwise validated.

The program can then be finalized and can go through an appropriate approval process in step 208. The approval process can include approval by individuals or the program can undergo various automated code checks in the unified framework module 304. Once the product is finalized, the program can be passed off to the development phase and to various developers in step 210 in FIG. 2, which is also illustrated in step 410 in FIG. 4. The development phase can be two stages where the various components are developed by identifying the desired capability and automatically adapted for the desired environment, e.g. personal computer, tablet, or smartphone and the application is assembled for the end user. Next or in conjunction with the development phase, a unified framework module 304 can be applied to the program where developers can build and publish the program to an entire community of developers.

Once the developers determine the user interface components of the program, the application may then be built by the unified framework module 304. In particular, pieces of the application can be obtained from the unified framework components repository as represented by step 411. The program can then enter the deployment phase 214, 414 where the product is targeted at particular devices and channels through the unified framework module 304. For example, the product could be targeted for an application configured for a desktop computer at a call center, a mobile or tablet application, or other online or web-based application that the user can access by logging into the system. This can occur in a visual studio 318 in the unified framework module 304 where the program is built for evaluating/testing, and/or perfecting the prototype or application and eventually released to the end users at step 420. In the visual studio the designer can interact with the program to assess and discover the functionality and design of the program. The visual studio 318 can include drag and drop functionality such that the reusable components can be moved and adjusted within the user interface design. The visual studio can also provide an automatic building functionality where the program is automatically built within the visual studio for testing and analysis.

The unified framework module 304 can also include a device and channel detector 320, which can be configured to provide device and channel detection and services for applications to determine the device and channel capabilities. In this way the unified framework module 304 can be configured to understand what the capabilities are for a particular device and channel and determine which particular reusable user interface components to implement. The unified framework module 304 can also configure the application based on the capabilities of the channel or device.

In the implementation process, which may occur in the unified framework module 304, the program is packaged and the necessary components are pulled together and bundled for the specific device or channel. In this way, the user interface is built for multiple devices and channels and can be customized and reused in each device or channel. The user interface is, thus, reusable and customized, and various variables, such as the screen size, environment, capabilities of the device or channel, inputs (e.g. keyboard, mouse, touch screen), and the like, are taken into account. The unified framework module 304 can, thus, reflect or adapt to the different environments created by the devices or channels, and can be configured to be adaptive and responsive to the different environments created by the devices or channels. In this process, no code conversion needs to occur, since the framework of the user interface is pre-packaged. The program can be subsequently launched across various devices and channels at step 216 by reusing the user interface components across all channels and devices.

The unified framework module 304 helps to provide an end-to-end process where the requirements of the application are mapped out into reusable user interface components, and to provide a centralized repository. The centralized repository provides a robust inventory that can be reused and allows the ability to discover, collect feedback, and assemble programs. This can make the application design journey more efficient and more consistent.

Figure 3:
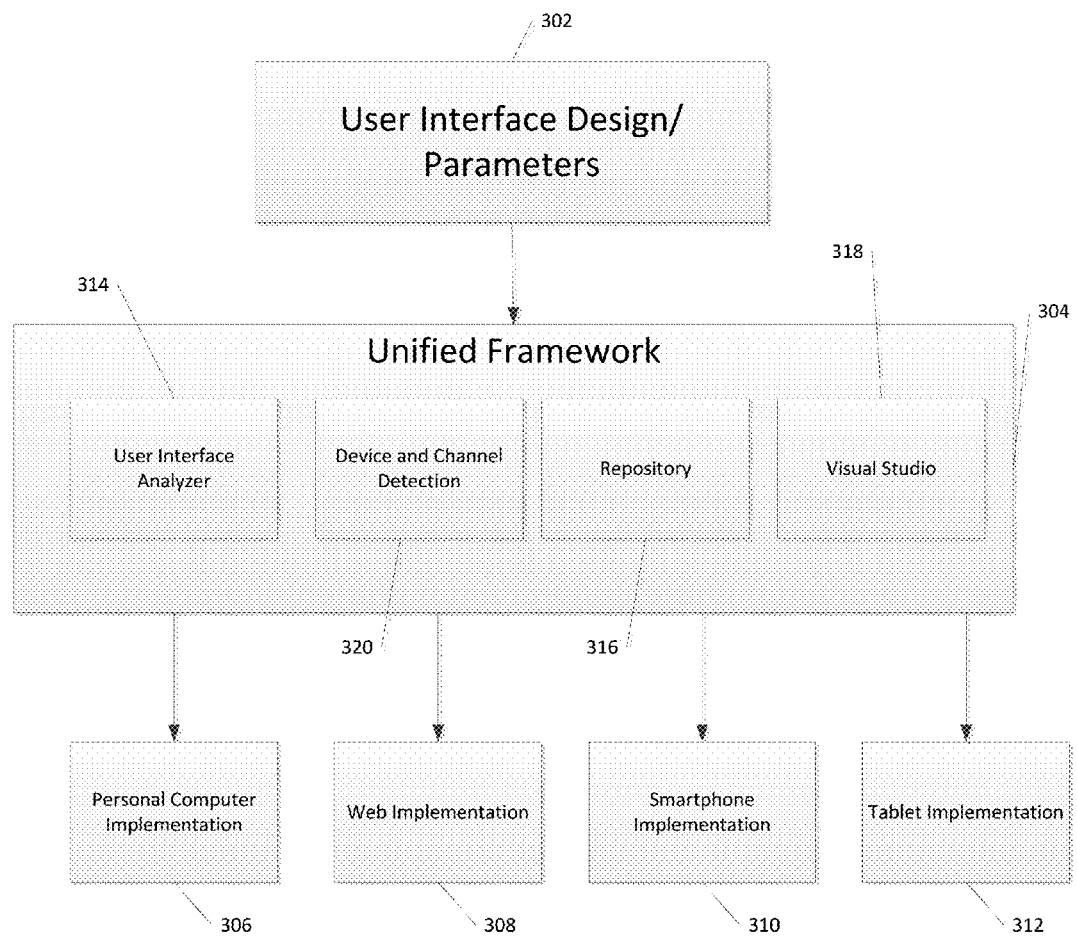
FIG. 3 illustrates a schematic of an exemplary system disclosed herein.
Figure 4:
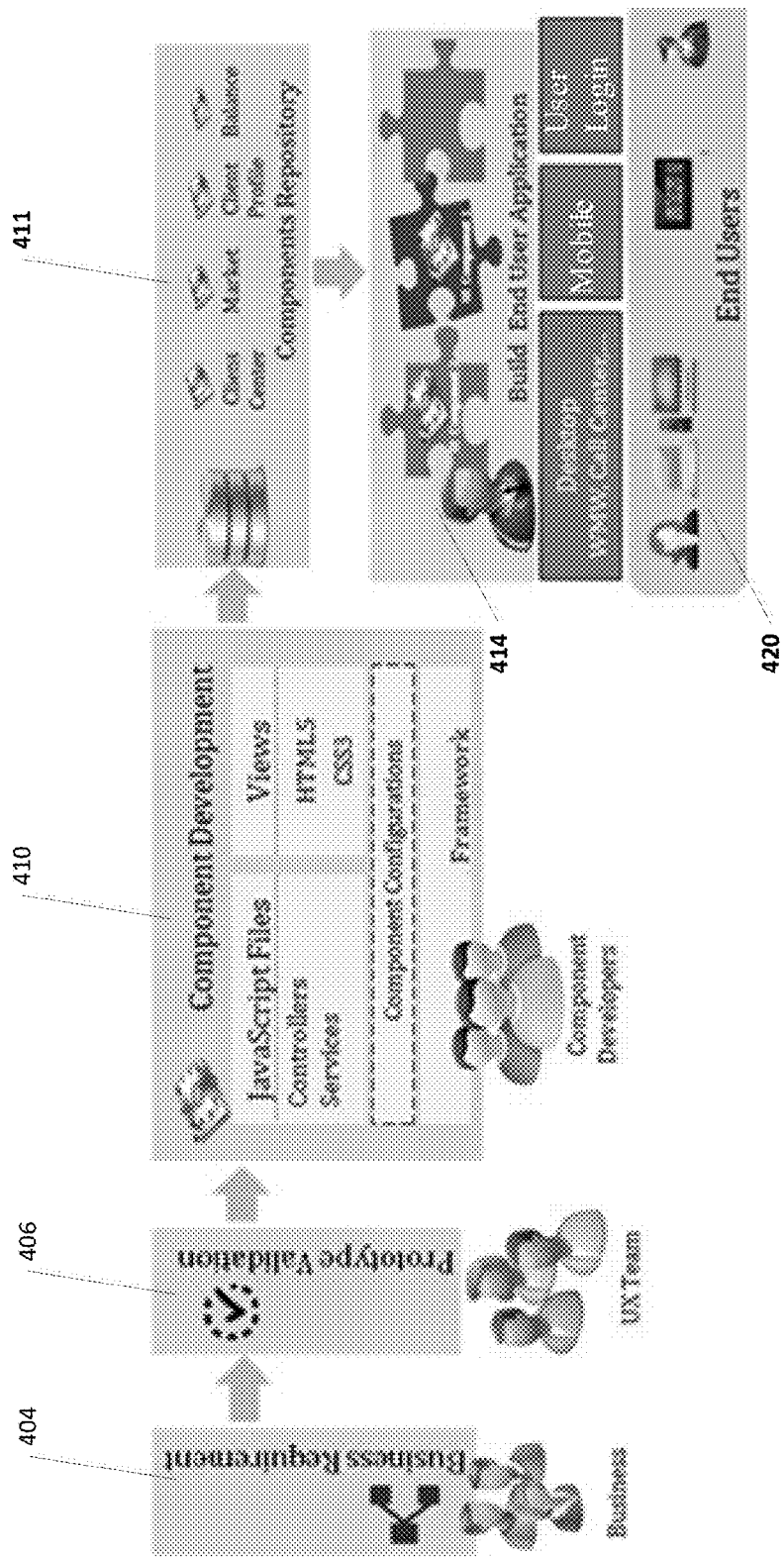
FIG. 4 illustrates a schematic of an example process flow disclosed herein.

As depicted schematically in FIG. 3, the unified framework module 304 can detect and simulate the user interface in each device (e.g. personal computer, web, smartphone, tablet, and the like) such that the program can be built in each device. The unified framework module 304 can also package the program in a form that is suitable for each device and/or channel. The unified framework module 304 can also act as a testing module where the program can be tested in various devices, such as a personal computer 306, web-based environment 308, smart phone 310, or tablet 312, and other operating systems depending on the devices and channels that are targeted. The unified framework module 304 can pull up each operating system and or device parameters to implement the program on each device or channel, and the unified framework module 304 can be configured to support each of the desired devices or channels.

The unified framework module 304 can also be configured to be backwards compatible to accommodate older devices and channels. The unified framework module 304 can be configured to evaluate legacy programs or programs that have been previously launched during the development lifecycle for updating purposes or to adapt legacy programs or previously launched programs to different devices or channels. The unified framework module 304 can package the program into the appropriate framework that is suitable for each device by building and deploying the program for the targeted devices and channels and deploy the end product.

The unified framework module 304 may also provide an ecosystem where the user can build individual reusable user interface components or access templates. The access templates can include one or more of the desired reusable user interface components that can be used to build the application. As shown in FIG. 4, the unified framework module can include JavaScript Files that may include controllers and services, views containing such files as HTML5 and CSS3 files, and various other component configurations for assembling an application. The unified framework module 304 may also provide a centralized build feature that allows the program to be published in the repository 316. In publishing the program, the various features can be evaluated and validated to perfect the program. This can occur in a visual studio module 318 at the unified framework module 304 where the program is built for testing and viewing. The unified framework module 304 ecosystem can also provide a centralized way to attach each user interface component from the repository during the build process. This can also create a high level of reusability, which aids in quickly assembling the program and cutting down on development and implementation time. This assists in prototype validation where the various reusable user interface components can be built and added to the repository for future prototype validation. The unified framework module and repository 316 provides everything in one place such that everything can be accessed in a centralized location, where the user can access the unified framework module 304 and repository 316 and quickly locate and assemble the reusable user interface components. In certain examples, the repository 316 may also include containers for each of the devices or channels. Each container may include a collection of reusable interface components for the particular device and/or channel, e.g. computer, web, or mobile device.

The user interface analyzer 314 can be a module configured to analyze the program for reusable user interface components. For example, the user interface analyzer 314 can review programs to extract and break down the programs into their various reusable user interface components and capture the unique experience delivered by the program. The user interface analyzer 314 can review a webpage, for example, and can visually break down the webpage into its various reusable user interface components (e.g. marketing material, text tabs, menu structures, touch items, information displays, scroll bars, and the like). Each of these features or visual reusable user interface components can be parsed out of the program. Each of these components can then be extracted from the repository 316, and the unified framework can build a prototype of the program from the reusable user interface components extracted by the user interface analyzer. Each of the user interface features can be implemented across the targeted devices and channels to provide a consistent look and feel of the reusable user interface components across all devices and channels.

The unified framework module 304 can also provide standards and guidelines that can be used to assemble and build applications. This can also assist in maximizing reusability since the program is developed within predetermined boundaries or rules. When guidelines are implemented, reusability is promoted because the development is bound by the rules defined by the unified framework module 304 build capabilities, user interface analyzer 314, repository 316, and visual studio 318. Also the unified framework module 304 can be configured to check the underlying code on each device for errors to facilitate the launch process.

In one example, after program features are extracted from the developers, the unified framework module 304 can provide support to multiple devices or channels by identifying and launching various APIs across each device or channel instead of developing new code for each device or channel. In this way, when the unified framework module 304 is called upon, no translation or conversion is conducted, rather the unified framework module 304 can find the common feature and determine the code or API appropriate for the device or channel and call the desired code or API from the repository 316 and build the features according to the way that it is called in the device.

For example, the unified framework module 304 can identify an image capturing feature and make use of a common API across each targeted device for the program. In this way, the program can be abstracted and may not need any translation to launch the program in the various targeted devices or channel.

In a working example, the program to be implemented could be written in java. The unified framework algorithm will execute the program in the desired environment. In particular, the program can take the java program and access the framework container to extract the functionality and user interface from the framework to get whatever items needed for the targeted devices to launch to each of the targeted devices. In this way, the usability is promoted without compromising the native user experience through the use of the unified framework module 304. The unified framework module 304 can provide the appropriate support for launching the program in the targeted devices and channels.

The features of the application, such as the user interface features and feature sets designed and developed to the unified framework module 304, can be stored into a system repository 316, which can be a centralized repository for easy access during the development and lifecycle of the program. The repository can be accessed during the development of the application such that the various user interface features can be easily accessed during the design and build and deployment processes. The repository can also act as an inventory of the user interface features that can be used in the development of the user interface. For example, the repository provides a centralized location to store, discover, browse, modify and retrieve the user interface features and components and build additional reusable user interface components by composing them together or creating end-to-end applications consisting of multiple reusable user interface components. This also facilitates a conduit to develop rapid prototypes of new user experiences, with sharable reusable user interface components across the enterprise that are easily created, and deployed at a rapid pace. The prototypes may also be published in the repository for accessing during the validation process.

Additionally, the repository can be used to collect feedback. The feedback can also be stored into the repository such that the feedback can be reviewed during the development of the product. For example, the feedback can be organized so as to be attributed to a particular screen or particular feature. In another example, the screens can be labeled by a reference number(s) or letter(s) and the feedback can be stored to each reference number(s)/letter(s). This feature can make the whole design process more powerful and cost effective during the design and build process.

In one exemplary aspect, the unified framework module 304 can provide a transformational experience of the application where during the development of the application, the unified framework module 304 can provide a useful tool in perfecting the application before delivering the application to the targeted devices or channels. It can also assist in tying together designers, developers, and the business in the development of the application, in that everyone that is involved with the process can test the prototypes and provide feedback during the development process across all devices and channels.

Figure 5:
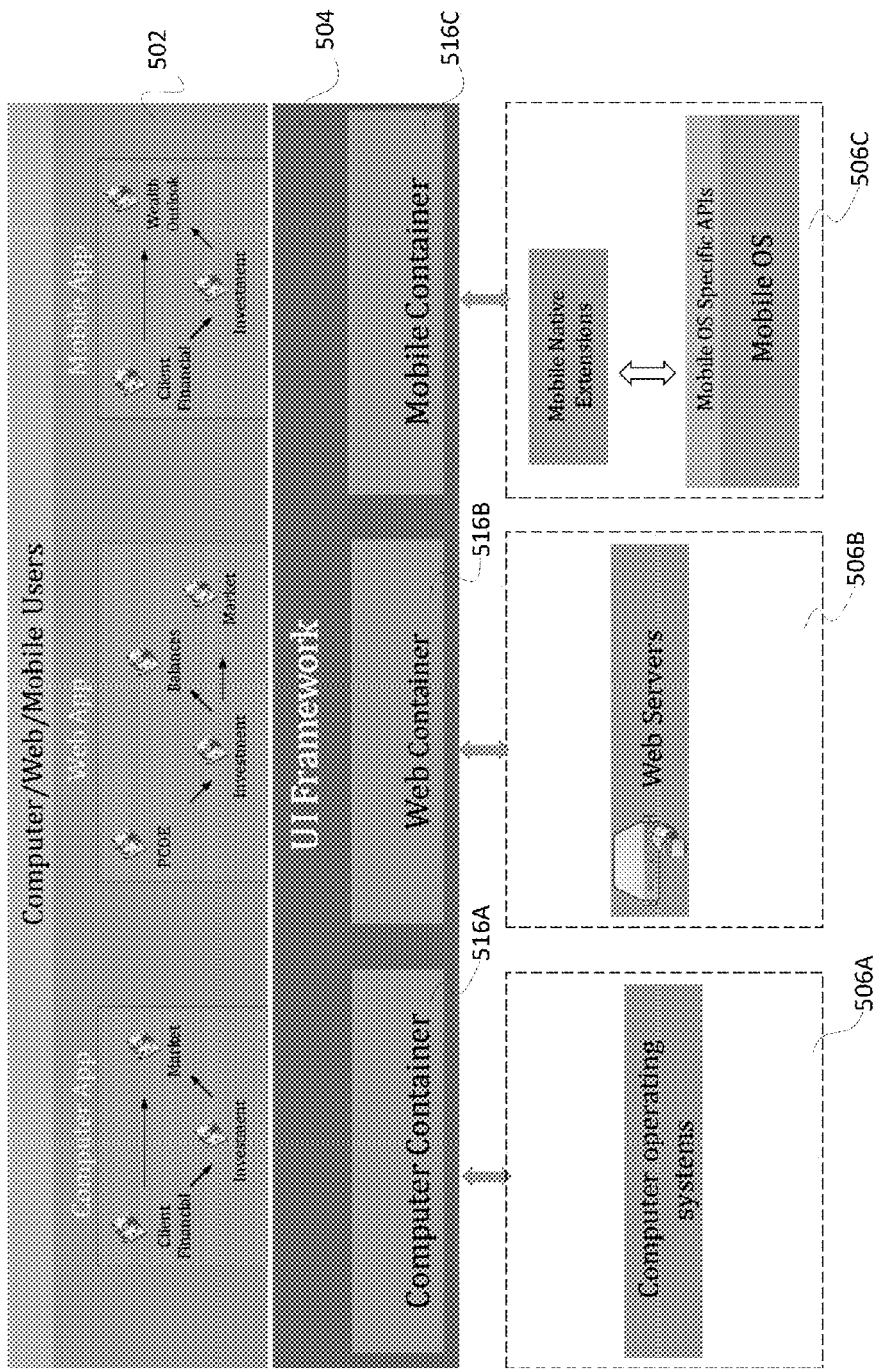
FIG. 5 illustrates a schematic of another exemplary system disclosed herein.

FIG. 5 depicts another example of a process of implementing an application in various devices and channels. In this example an application with various predetermined specifications depending on the desired characteristics can be launched across multiple devices and channels. The implementation process can include similar features and components as the implementation process described in relation to FIG. 3. The user interface design and parameters 502 can, in one example, be the same for each of the applications and channels, e.g. personal computer, web, smartphone, or tablet. Like in the above example in FIG. 3, the unified framework module 504 can detect and simulate the user interface in each device (e.g. personal computer, web, smartphone, tablet, and the like) such that the program can be built in each device. The unified framework module 504 can also package the program in a form that is suitable for each device and/or channel. In this particular example, the unified framework module 504 can be divided up into separate containers 516A, 516B, and 516C, which can form a repository 516 for implementing the application into each environment and/or device. For example, a computer container 516A can create any application with the desired reusable user interface components for desktops, laptops, notebook, a web container 516B can create any applications with the desired reusable user interface components for web applications, and a mobile container 516C can create applications with the desired reusable user interface components for any smartphone, tablet, PDA, or other mobile device. Additionally, multiple container types can be provided depending on the desired devices and channels. For example, it may be desired to launch the application in multiple computer system types or mobile system types, and there can be a particular container corresponding to each computer or mobile system type.

Each of the containers 516A, 516B, and 516C can be used to create the same user interface for the same application across any of the devices or channels depending on the particular specifications provided. Specifically, each of the containers 516A, 516B, and 516C can include and provide user interface components that can be reusable for each program being implemented.

In one example, a user interface can be built with reusable user interface components with the centralized repository 516, which includes one or more of the computer container 516A, the web container 516B, and the mobile container 516C, and the reusable user interface components can be extracted from the computer container 516B, the web container 516B, and the mobile container 516C and at least one separate user interface can be built for each of a plurality of channels or devices with the corresponding container.

The unified framework module 504 can also provide a centralized and direct way to abstract each user interface component from the repository during the build process in each device and or channel, e.g. computer operating systems 506A, web servers 506B, or mobile operating system 506C.

Additionally, the unified framework module 504 and the containers 516A, 516B, and 516C provide standardization for the various reusable user interface components and responsiveness to the environment of the different devices and channels. Moreover, in other examples the unified framework 504 in conjunction with the containers 516A, 516B, and 516C can accommodate for the different device sizes in reconfiguring the various reusable user interface components according to the particular design parameters of the device.

Figure 6:
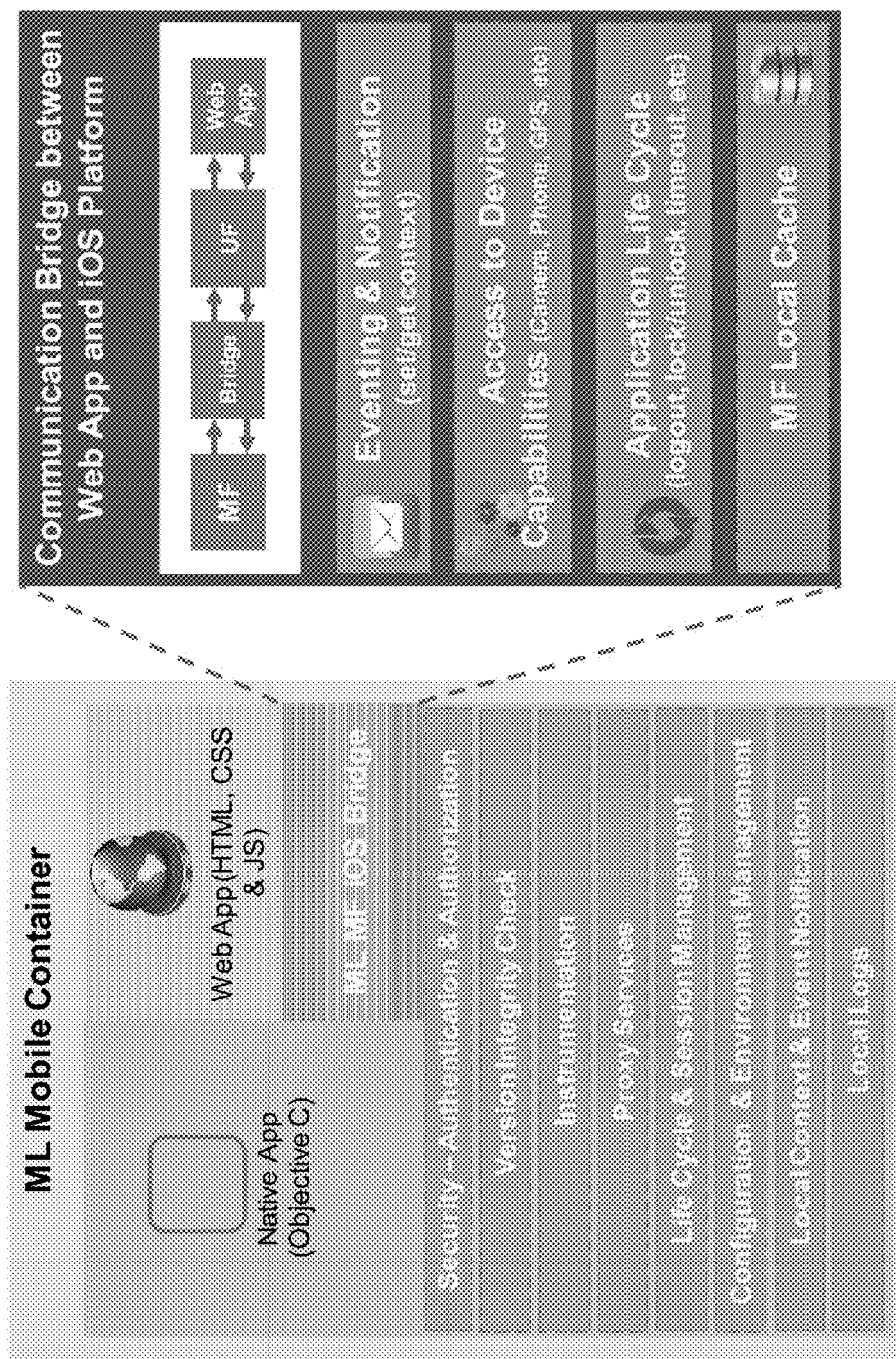
FIG. 6 illustrates a schematic of an aspect of an exemplary system disclosed herein.

FIG. 6 shows an example container that can be incorporated with the unified framework modules discussed herein. In this example a native application having an objective C can be launched into either a mobile application or a web-based application. The container, in this example, can include a bridge between a web-based application and a mobile application platform. In this way the application features can be abstracted from either the web-based application or the mobile application platform and can be launched in either platform.

In another exemplary aspect, the system described herein may help provide a richer user experience across all platforms, channels and devices by maintaining a highly interactive user interface across any device, platform or channel that supports highly interactive user interfaces. For example, rather than designing the application to the lowest common denominator user interface, the application of the unified framework can carry over touch friendly features (e.g., touch enabled gestures, swipe features), pop-up bars, and various menu items into the devices that support it. The system helps the application adapt to the channel or device and helps avoid cutting back on highly interactive features on devices and channels that support them. The system can also help cut down on writing native code for each device or channel because the unified framework is able to bring the desired functionality into each device or channel automatically. This helps to enable developers to build software only once and deploy it across numerous channels and devices with minimal development effort.

In other exemplary aspects, the various platforms can be connected so that application development practices are standardized by leveraging core set of common capabilities to enable a seamless collaboration. Applications can be thought of as a set of reusable, device/channel agnostic user interface components that can be easily assembled to provide the required user experience. Applications can follow a more responsive design so that the application layout is flexible and fluid adapting to the layout of the device's screen. Applications can also follow an adaptive design so that user experience is tailored specifically to take advantage of device/channel specific features. Additionally, every touch point business solution can be reviewed from a mobile first perspective and can automatically trigger architecture reviews.

An example method for developing a device agnostic application may include one or more of (1) providing an application having one or more reusable user interface components, (2) analyzing the application for the one or more reusable user interface components (3) assembling the reusable user interface components from the repository (4)

extending the application and the user interface to at least one device or channel. A unified framework module may extend the application and the user interface to at least one device or channel. The method may also optionally include storing the reusable user interface components in a repository, which provides a centralized location to store, discover, browse, modify, and retrieve the reusable user interface components.

The user interface intentions and behaviors can be preserved end to end and during the deployment of the application. The method may also optionally include providing a visual studio for building a prototype of the application in the at least one device or channel and evaluating and testing the application. The user interface components of the repository can be reusable. The unified framework module can be used to simulate the user interface in the at least one targeted device or channel. The method may also optionally include extending the application and the user interface to a second device or channel through the unified framework module. The method may also optionally include providing access templates having the one or more reusable user interface components for building the application. The method may also optionally include collecting feedback and storing the feedback into the repository for later viewing and perfecting the application.

In another example a unified framework module can include a user interface analyzer configured to analyze a program for reusable user interface components, a repository configured to store the reusable user interface components, and a visual studio configured to build a prototype of the program. The user interface analyzer can extract the reusable user interface components of the program from the repository. The visual studio or the unified framework module can build the prototype of the program from the reusable user interface components extracted by the user interface analyzer. The visual studio can simulate the program for testing and viewing. The unified framework module can be configured to package the program in a form that is suitable for a plurality of devices or channels. The visual studio can be configured to collect feedback on the prototype, and the repository can be configured to store the feedback.

An example method may include analyzing an application having one or more user interface components, extracting the user interface components from the application, building the user interface with the user interface components from a centralized repository, and extending the application having the one or more the user interface components to a plurality of channels or devices. The method can further include storing the user interface components in the centralized repository, and the centralized repository can provide a centralized location to store, discover, browse, modify, and retrieve the user interface components. The method may further include providing a visual studio for building a prototype of the application in the at least one device or channel and evaluating and testing the application. The user interface components of the repository can be reusable. The method may also include simulating the user interface in the at least one targeted device or channel, providing access templates having the one or more user interface components for building the application, and collecting feedback and storing the feedback into the repository for later viewing and perfecting the application.

An example method can include creating an application having one or more user interface components by extracting the user interface components from a centralized repository, simulating the application in a visual studio, and extending the application and the user interface to a plurality of channels or devices. The method can further include storing the user interface components in the repository, which provides a centralized location to store, discover, browse, modify, and retrieve the user interface components, analyzing the application for the one or more user interface components and assembling the user interface components from the repository.

The visual studio can be configured to build a prototype of the application in the at least one device or channel for evaluating and testing of the application. The user interface components of the repository can be reusable. The method may further include providing access templates having the one or more user interface components for building the application, and collecting feedback and storing the feedback into the repository for later viewing and perfecting the application.

In another example, an apparatus comprising: a processor; and a memory for storing computer readable instructions that, when executed by the processor, can cause the apparatus to perform the methods discussed herein. In another example, one or more non-transitory computer-readable media may have instructions stored thereon that, when executed, cause at least one computing device to perform one or more aspects of the methods discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method for developing a device agnostic software application comprising:
    analyzing a software application having one or more user interface components;
    extracting the one or more user interface components from the software application;
    storing the one or more extracted user interface components in a centralized repository, the centralized repository including one or more of a computer container, a web container, and a mobile container for storing the one or more extracted user interface components;
    building, by a unified framework having the centralized repository, at least one separate user interface for the software application for each of a plurality of channels or devices, wherein each of the plurality of channels or devices is associated with one of the computer container, the web container, and the mobile container, and wherein the at least one separate user interface for the software application is built with the one or more extracted user interface components stored in the computer container, the web container, and the mobile container; and
    extending the software application having the at least one separate user interface to each of the plurality of channels or devices according to the association of each of the plurality of channels or devices to the computer container, the web container, and the mobile container.

2. The computer-implemented method of claim 1 further comprising providing a visual studio for building a prototype of the software application and for evaluating and testing the software application.

3. The computer-implemented method of claim 2 wherein the one or more user interface components stored in the centralized repository are reusable across the plurality of channels or devices.

4. The computer-implemented method of claim 1 further comprising simulating the at least one separate user interface in at least one of the plurality of devices or channels.

5. The computer-implemented method of claim 1 further comprising detecting capabilities of the plurality of channels or devices and configuring the software application based on the capabilities of the plurality of channels or devices.

6. The computer-implemented method of claim 1 further comprising collecting feedback and storing the feedback into the centralized repository for later viewing and perfecting the software application.

7. An apparatus comprising:
a processor; and
memory storing computer readable instructions that, when executed by the processor, cause the apparatus to:
analyze a software application having one or more user interface components;
extract the one or more user interface components from the software application;
store the one or more extracted user interface components in a centralized repository, the centralized repository including one or more of a computer container, a web container, and a mobile container for storing the one or more extracted user interface components;
create at least one separate user interface for the software application for each of a plurality of channels or devices, wherein the at least one separate user interface is created by:
extracting the one or more user interface components from the centralized repository, wherein the extracting includes extracting the one or more user interface components from the computer container, the web container, and the mobile container, and wherein each of the plurality of channels or devices is associated with one of the computer container, the web container, and the mobile container, and
building the at least one separate user interface for the software application for each of the plurality of channels or devices, wherein the at least one separate user interface is built with the one or more user interface components extracted from the computer container, the web container, and the mobile container;
simulate the software application having the at least one separate user interface in each of the plurality of channels or devices in a visual studio according to the association of each of the plurality of channels or devices to the computer container, the web container, and the mobile container to determine whether the one or more user interface components are organized; and
responsive to determining that the one or more user interface components are organized, extend the software application having the at least one separate user interface to each of the plurality of channels or devices according to the association of each of the plurality of channels or devices to the computer container, the web container, and the mobile container.

8. The apparatus of claim 7 wherein the centralized repository provides a centralized location to store, discover, browse, modify, and retrieve the user interface components.

9. The apparatus of claim 7 further comprising analyzing the software application for the one or more user interface components and assembling the user interface components from the centralized repository.

10. The apparatus of claim 7 wherein the visual studio is configured to build a prototype of the software application in at least one of the plurality of devices or channels for evaluating and testing of the software application.

11. The apparatus of claim 8 wherein the user interface components of the repository are reusable.

12. The apparatus of claim 7 further comprising detecting capabilities of the plurality of channels or devices and configuring the software application based on the capabilities of the plurality of channels or devices.

13. The apparatus of claim 8 further comprising collecting feedback and storing the feedback into the repository for later viewing and perfecting the software application.

14. One or more non-transitory computer-readable media having instructions stored thereon that, when executed, cause at least one computing device to:
provide a unified framework, the unified framework comprising:
a user interface analyzer configured to analyze a software program for user interface components and extract the user interface components from the software program,
a repository configured to store the extracted user interface components, the repository comprising a computer container, a web container, and a mobile container; and
wherein the user interface analyzer extracts the user interface components of the software program from the repository by extracting reusable user interface components from the computer container, the web container, and the mobile container, wherein the unified framework builds a prototype of the software program from the user interface components extracted by the user interface analyzer from the computer container, the web container, and the mobile container and extends the software program into a plurality of devices or channels.

15. The one or more non-transitory computer-readable media of claim 14 wherein a visual studio simulates the software program for testing and viewing.

16. The one or more non-transitory computer-readable media of claim 14 wherein the unified framework is configured to package the software program in a form that is suitable for a plurality of devices or channels.

17. The one or more non-transitory computer-readable media of claim 15 wherein the visual studio is configured to collect feedback on the prototype and the repository is configured to store the feedback.

18. The one or more non-transitory computer-readable media of claim 14 wherein the user interface components of the repository are reusable.

19. The one or more non-transitory computer-readable media of claim 14 further comprising detecting capabilities of the plurality of channels or devices and configuring the software program based on the capabilities of the plurality of channels or devices.

20. The computer-implemented method of claim 1, wherein the one or more user interface components are one or more widgets or graphical control elements.

* * * * *